(12) United States Patent
Gallagher et al.

(10) Patent No.: US 12,493,901 B2
(45) Date of Patent: Dec. 9, 2025

(54) MANAGING CLOUD RESOURCE CONSUMPTION USING DISTRIBUTED LEDGERS

(71) Applicant: Red Hat, Inc., Raleigh, NC (US)

(72) Inventors: Brian Gallagher, Waterford (IE); Cathal O'Connor, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 333 days.

(21) Appl. No.: 17/898,638

(22) Filed: Aug. 30, 2022

(65) Prior Publication Data

US 2024/0070735 A1    Feb. 29, 2024

(51) Int. Cl.
*G06Q 30/04* (2012.01)
*G06F 9/50* (2006.01)

(52) U.S. Cl.
CPC ............ *G06Q 30/04* (2013.01); *G06F 9/5072* (2013.01); *G06F 2209/508* (2013.01); *G06Q 2220/12* (2013.01)

(58) Field of Classification Search
CPC .......... G06N 20/00; G06N 3/08; G06Q 30/04; G06F 9/5072; G06F 2209/508; G06F 2009/508; G06F 2220/12

See application file for complete search history.

(56) References Cited

U.S. PATENT DOCUMENTS

| | | | |
|---|---|---|---|
| 8,792,856 B2* | 7/2014 | Velusamy | H04M 15/80 455/406 |
| 9,239,996 B2* | 1/2016 | Moorthi | G06Q 10/06 |
| 10,528,551 B2* | 1/2020 | Li | H04L 9/3239 |
| 10,686,799 B2 | 6/2020 | Kelly | |
| 10,833,861 B2 | 11/2020 | Chari et al. | |
| 10,924,363 B2 | 2/2021 | Pan et al. | |
| 10,984,474 B1* | 4/2021 | Seymour | G06Q 20/389 |
| 11,169,985 B2* | 11/2021 | Innocenti | H04L 63/00 |

(Continued)

OTHER PUBLICATIONS

Taghavi et al., "A Blockchain-based Model for Cloud Service Quality Monitoring", Concordia Institute for Information System Engineering, Concordia University, Canada; Department of ECE, Khalifa University, UAE; Interactive Systems, University of Duisburg-Essen, Duisburg, Germany; Department of Electrical & Electronic Engineering, Universiti Kebangsaan Malaysia, Malaysia, 2019, 12 pageshttps://www.researchgate.net/publication/336623007_A_Blockchain-Based_Model_for_Cloud_Service_Quality_Monitoring.

(Continued)

*Primary Examiner* — Florian M Zeender
*Assistant Examiner* — Milena Racic
(74) *Attorney, Agent, or Firm* — Womble Bond Dickinson (US) LLP

(57) ABSTRACT

Systems and methods of the disclosure include: identifying, by a cloud resource management system, a cloud resource consumption model associated with one or more cloud resources; generating, by the cloud resource management system, a sequence of instructions implementing a smart contract based on the cloud resource consumption model; sending, to a distributed ledger network, the smart contract; receiving, by the cloud resource management system, cloud resource usage data associated with the one or more cloud resources; and causing, by transmitting a message reflecting the cloud resource usage data to the distributed ledger, the smart contract to be executed.

20 Claims, 6 Drawing Sheets

(56) References Cited

U.S. PATENT DOCUMENTS

| | | | |
|---|---|---|---|
| 11,182,379 B2* | 11/2021 | Yang | G06F 16/27 |
| 11,263,204 B2* | 3/2022 | Kempf | H04L 9/3239 |
| 11,463,553 B2* | 10/2022 | Zhan | H04L 67/5682 |
| 11,546,425 B2* | 1/2023 | Yang | H04L 67/288 |
| 11,650,972 B1* | 5/2023 | Newman | G06F 16/211 |
| | | | 707/687 |
| 11,706,155 B1* | 7/2023 | O'Connor | H04L 47/781 |
| | | | 709/226 |
| 11,822,538 B2* | 11/2023 | Yang | G06F 16/27 |
| 12,095,924 B2* | 9/2024 | Little | H04L 9/3213 |
| 12,204,939 B1* | 1/2025 | Brown | G06F 9/4887 |
| 2013/0019015 A1* | 1/2013 | Devarakonda | G06F 9/5072 |
| | | | 709/226 |
| 2013/0091285 A1* | 4/2013 | Devarakonda | G06F 9/4856 |
| | | | 709/226 |
| 2014/0136375 A1* | 5/2014 | Agarwal | G06Q 30/0206 |
| | | | 705/27.1 |
| 2016/0267509 A1* | 9/2016 | Grosso | G06Q 30/0283 |
| 2017/0148044 A1* | 5/2017 | Fukuda | G06Q 30/0206 |
| 2018/0060894 A1* | 3/2018 | Beveridge | G06Q 30/08 |
| 2018/0314622 A1* | 11/2018 | Lowe | G06F 11/3616 |
| 2018/0337769 A1 | 11/2018 | Gleichauf | |
| 2019/0109877 A1* | 4/2019 | Samuel | G06F 21/44 |
| 2020/0005388 A1 | 1/2020 | Lim et al. | |
| 2020/0104958 A1* | 4/2020 | Cheng-Shorland | G06Q 10/101 |
| 2020/0294128 A1* | 9/2020 | Cella | H04L 9/3239 |
| 2021/0255931 A1* | 8/2021 | Badola | G06F 9/5077 |
| 2022/0138769 A1* | 5/2022 | Olson | H04L 9/50 |
| | | | 705/37 |
| 2022/0286299 A1* | 9/2022 | Manevich | H04L 9/3239 |
| 2022/0391957 A1* | 12/2022 | Layne | G06F 3/165 |
| 2023/0105028 A1* | 4/2023 | Cella | H04L 9/50 |
| | | | 705/7.31 |
| 2023/0173395 A1* | 6/2023 | Cella | G06N 3/0455 |
| | | | 463/25 |
| 2023/0214925 A1* | 7/2023 | Cella | G06Q 30/06 |
| | | | 705/37 |
| 2023/0289724 A1* | 9/2023 | Halbfinger | G06Q 10/0875 |
| 2024/0232964 A1* | 7/2024 | Agrawal | G06Q 30/04 |

OTHER PUBLICATIONS

Dai, "Internet of Quantum Blockchains: Security Modeling and Dynamic Resource Pricing for Stable Digital Currency", Department of Mathematics and State Key Laboratory of Novel Software Technology Nanjing University, China, Apr. 15, 2021, 40 pages https://arxiv.org/pdf/2104.07323.pdf.

Neidhardt et al., "Cloud Service Billing and Service Level Agreement Monitoring based on Blockchain", Hamburg Research Center for Information Systems, University of Hamburg, 5 pageshttps://dl.gi.de/bitstream/handle/20.500 12116/36802/EMISA_38_12.pdf?sequence=1&isAllowed=y.

Uriarte et al., "Distributed Service-Level Agreement Management with Smart Contracts and Blockchain", IMI School for Advanced Studies Lucca, Italy; Vienna University of Technology, Austria; School of Computer Science, National University of Defense Technology, China; Informatics Institute, University of Amsterdam, Amsterdam, The Netherlands; Information Systems Laboratory, ICS-FORTH, Heraklion, Greece; Cybersecurity National Laboratory, Italy, Apr. 28, 2020, 17 pageshttps://onlinelibrary.wiley.com/doi/full/10.1002/cpe.5800.

* cited by examiner

MANAGING CLOUD RESOURCE CONSUMPTION USING DISTRIBUTED LEDGERS

TECHNICAL FIELD

The implementations of the disclosure generally relate to computer systems and, more specifically, to managing cloud resource consumption using distributed ledgers.

BACKGROUND

Cloud services are widely used in various computer systems, including in the managed services context. For each cloud service, a cloud provider typically charges a cloud service client for various resources offered with the cloud service, including memory, bandwidth, storage, etc. A cloud provider may set prices for each cloud resource (e.g., based on a fixed rate).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
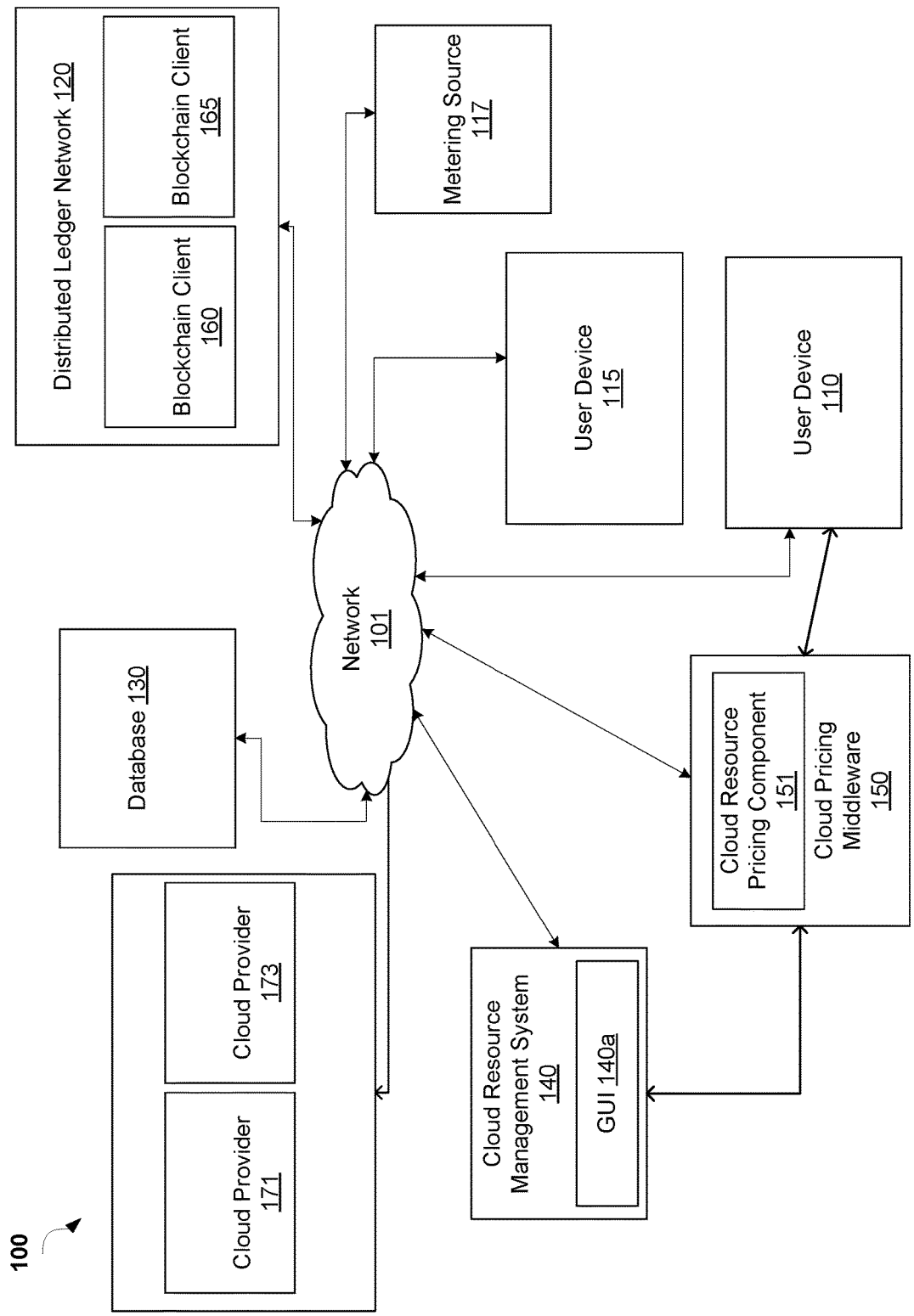
FIG. 1 depicts a block diagram of a network architecture 100 in accordance with one or more aspects of the present disclosure.

Described herein are systems and methods for managing cloud resource consumption using distributed ledgers.

Cloud providers often rely on managed services (e.g., cloud services) to facilitate the pricing of cloud resources being offered with cloud services, such as memory, bandwidth, storage, CPU, etc., based on fixed, upfront rates for each cloud resource. For example, a rate can be specified for certain cloud resource consumption, such as certain bandwidth usage or certain memory usage. Using predetermined rates might not always afford the desired degree of flexibility, in which case cloud providers and cloud service clients may create a dynamic consumption model taking into account multiple aspects of cloud resource usage. Further, a cloud provider can keep track of a cloud service client's usage of each cloud resource in order to later bill them. Keeping track of the cloud service client's usage of each cloud resource can involve using one or more metering sources. A metering source can be an external or internal software application and/or service that monitors the cloud service client's usage of cloud resources. The cloud provider can receive reports from the one or more metering sources with metering data representing the cloud service client's cloud resources usage. The cloud provider can then bill the cloud service client for their usage of each cloud resource based on the reports from the one or more metering sources and specified rate for each cloud resource. The cloud service client submits payment to the cloud provider based on the bill. Relying on a cloud provider to report metering usage requires trust between a cloud service client and the cloud provider that the reporting is accurate and that the one or more metering sources are reliable. There can also be a lack of transparency between the cloud provider and cloud service client, since the cloud service client must rely on the cloud provider and one or more metering sources to measure and report accurate usage information. Further, there can be issues of data integrity if the cloud provider uses a single metering source because there can be possible flaws in the single metering source's monitoring or possible tampering with the metering data.

Aspects of the present disclosure address the above and other deficiencies by providing systems and methods for managing the consumption, metering, and billing of cloud resources using cryptographically-secured distributed ledgers. A "distributed ledger" is a decentralized database that is spread across multiple (possibly geographically dispersed) nodes. The distributed ledger eliminates the need for a central authority by transferring authority and trust to a virtual network of nodes in a cloud-based system. Each node can sequentially record transactions in "blocks" of data by creating a unique "chain" also referred to as a blockchain. Each block can contain information associated with a particular electronic (e.g., online) transaction. A transaction generally reflects an update to data maintained on the distributed ledger.

A "blockchain" is one type of distributed ledger. The blockchain is a data structure comprising a complete history of each block (i.e., a complete record of data stored on each block) in the network from the first block to the most recently added block. Blocks of the blockchain behave like containers with data (e.g., transactions) in blocks that are connected to other blocks in the blockchain. The blocks are "immutable" in that they cannot be changed. Each node of the network stores a complete copy of the blockchain upon joining the network. Blocks of data are then processed by each node or otherwise added to the blockchain in a linear order. When the nodes are processing the blocks, the nodes link each block of data to a previous block in their copy of the blockchain, using a cryptographic fingerprint, such as a hash function.

To link the blocks, each node generates a cryptographic fingerprint by using a hash function that turns the block's data into a fingerprint of that data (also referred to as a hash value). A hash value is an output string of data generated by using a hash function to an input string of data. Although the input string can be arbitrarily large, the output hash value can be set to a fixed size in accordance with the hash function used. The nodes then successively build blocks that include a reference (e.g., a data pointer) to the hash value of the previous block in the blockchain. As such, the blocks of the blockchain are explicitly ordered by reference for the previous block's hash value, which reflects the content of that previous block. The hash values are used to secure (by cryptography) the authentication of the block data and the source associated with each block in the blockchain, which removes the need for a central authentication authority. Each hash value can be generated based on the input (i.e., the block data). More specifically, a one-way function that produces the same output for a given input can be employed to generate each hash value. A one-way function is a function that, from a computational complexity perspective, is "easy" to obtain an output for a given input, but "hard" to invert the output to identify the given input. This provides security against potential tampering with the blockchain.

Blocks are stored one after the other in the blockchain, but each block can only be added when all of the nodes reach a quorum (consensus) regarding rules about what new blocks can be added. To reach the quorum, the nodes of the network may transmit messages between each other regarding transactions for new block additions that are happening to one another. For example, various consensus schemes can be employed, such as proof-of-work or proof-of-stake methods.

Proof-of-work methods can incentivize participation in consensus by providing a reward for successfully performing consensus tasks. One example of a proof-of-work method is referred to as "mining" (e.g., in Bitcoin). Generally, mining involves attempting to discover a nonce (number used once) value to add to a block corresponding to a transaction to be added to the blockchain. The nonce affects the hash value calculated for a block. Nodes performing the consensus process, referred to as "miners," can agree upon some pattern that should appear in the hash value of the block plus nonce data, and can iterate through a series of random numbers for the nonce until the pattern appears in the hash value (e.g., the pattern can be that the hash value begins with a sequence of six zeroes). Once a nonce value is discovered that can generate the pattern, the nonce value is provided to the other miners to confirm the validity of the nonce value. Once a threshold number of nodes agrees that the nonce value is valid (e.g., a majority of nodes), then consensus is reached and the data can be written to the blockchain. The miner who discovered the nonce value can be provided with a monetary reward (e.g., digital currency).

Proof-of-stake methods can incentivize participation in consensus by employing a stake approach. Here, users can stake credits for the right to validate transactions (e.g., by depositing digital currency into a central wallet), and transaction validation (e.g., mining) power for a user is a function of the amount of credits that have been staked. A user's percentage of the total amount of credits staked can correspond to a percentage of blocks that the user can validate. For example, if a user owns 10% of the total staked credits, the user can validate 10% of the total number of blocks (e.g., a 10% chance to perform the block validation).

In some implementations of the present disclosure, a distributed ledger network can be employed to store a cloud resource consumption model, store cloud resource usage data, and store and execute a smart contract to implement cloud resource pricing and payment based on one or more inputs including the cloud resource consumption model and the cloud resource usage data. A cloud resource management system can identify a cloud resource consumption model to be used for a particular cloud resource. The cloud resource consumption model can be identified, e.g., based on system metadata, GUI input, etc.

After identifying the cloud resource consumption model, the cloud resource management system can, before launching the cloud resource consumption model, validate the model by comparing the logical and/or physical schema of the cloud resource consumption model (i.e., the structure of data included in the cloud resource consumption model) to the logical and/or physical schema of a pre-defined pricing application programming interface (API) specification (i.e., the organizational structure of data included in the pricing API specification). The pricing API specification can be formatted in a JavaScript Object Notation (JSON). In response to validating the cloud resource consumption model (e.g., verifying that the schema of the cloud resource consumption model and the schema of the pricing API specification are both in JSON format), the cloud management system can send the cloud resource consumption model to one or more cloud providers and/or one or more cloud service clients to electronically sign the cloud resource consumption model. In response to receiving the electronic signatures from the one or more cloud providers and/or one or more cloud service clients, the cloud management system can send a smart contract to the distributed ledger network and can periodically send cloud resource usage data to the distributed ledger.

The smart contract can be created by the cloud resource management system, e.g., by generating a set of executable instructions ("executable code") that applies the cloud resource usage data to a chosen cloud resource consumption model and computes the payment that is due to or from the cloud service client.

Sending data including the smart contract to the distributed ledger network can include building a transaction reflecting the smart contract and sending (e.g., broadcasting) the transaction over a network connecting the cloud resource management system and the distributed ledger network. The transaction data can include data relating to the smart contract. In some embodiments, the transaction data can further include metadata, such as a transaction number associated with the transaction.

In some implementations, multiple nodes of the distributed ledgers can listen for transactions broadcasted over the network. Responsive to receiving the transaction data, a node of the distributed ledger can validate the transaction data. Validating the transaction data can involve applying a set of validation rules to the transaction. Once the node of the distributed ledger validates the transaction data, the node of the distributed ledger can add the transaction data to a current block (e.g., the block that is being assembled based on incoming transaction data). Responsive to determining that the block has reached a predefined size, the node of the distributed ledger can broadcast the block on the network to other nodes of the distributed ledger. The node of the distributed ledger can further add the block to a local copy of the blockchain stored in a local storage of the node of the distributed ledger.

In some implementations, the cloud resource management system can receive cloud resource usage data from one or more cloud resource metering sources. Each cloud resource metering source can be a service that monitors and/or keeps track of the usage of each cloud resource by a cloud service client. The cloud resource usage data can include cloud resource usage data for a cloud service client. In some embodiments, the cloud resource management system can validate the cloud resource usage data by determining that one or more electronic signatures have been received from the one or more cloud resource metering sources. In some embodiments, the cloud resource management system can further validate the cloud resource usage data, e.g., by computing an aggregate (e.g., the weighted average) score of each cloud resource metering source. The weights and/or reputation scores can be pre-assigned by the cloud management system to each cloud resource metering source. The cloud resource management system can combine the cloud resource usage data received from each of the cloud resource metering sources. Combining the cloud resource usage data received from each of the cloud resource metering sources can include comparing the weighted average scores assigned to each cloud resource metering source to each other. In response to comparing the weighted average scores assigned to each cloud resource metering source to each other, the cloud resource management system can identify which cloud resource metering source to prioritize. For example, the cloud resource management system can compare the weighted average scores assigned to each cloud resource metering source and identify the cloud resource metering sources from highest weighted average score to lowest weighted average score. The cloud resource management system can prioritize the cloud resource metering sources with the higher weighted average scores. In some embodiments, combining the cloud resource usage data can include multiplying the data received from each cloud resource metering source by the weighted average score assigned to each cloud resource metering source, adding together each result of multiplying the data from each cloud resource metering source by the weighted average score (i.e., as computed in the previous step), and computing an average score (e.g., by dividing the computed result from adding together each result of multiplying the data from each cloud resource metering source by the weighted average score). In some embodiments, the cloud resource management system can send (e.g., periodically) the cloud resource usage data (e.g., the computed average score) to the distributed ledger network. Sending the cloud resource usage data can include building a transaction reflecting the cloud resource usage data and sending (e.g., broadcasting) the transaction over the network connecting the cloud resource management system and the distributed ledger network. The transaction data can include relevant data relating to the cloud resource usage data, including data regarding the amount of usage of each cloud resource for a cloud service client. In some embodiments, the transaction data can include data identifying the cloud service client, such as an Internet Protocol (IP) address of a computer system associated with the cloud service client, an identifier of the cloud service client, and/or an identifier of the computer system associated with the cloud service client. In some embodiments, the transaction data can further include metadata, such as a transaction number associated with the transaction.

As noted herein above, multiple nodes of the distributed ledger can listen for transactions broadcasted over the network. Responsive to receiving the transaction data, a node of the distributed ledger can validate the transaction data. Validating the transaction data can involve applying a set of validation rules to the transaction. Once the node of the distributed ledger validates the transaction data, the node of the distributed ledger can add the transaction data to a current block (e.g., the block that is being assembled based on incoming transaction data). Responsive to determining that the block has reached a predefined size, the node of the distributed ledger can broadcast the block on the network to other nodes of the distributed ledger. The node of the distributed ledger can further add the block to a local copy of the blockchain stored in a local storage of the node of the distributed ledger.

In some implementations, the cloud resource management system can cause the smart contract to be executed. Executing the smart contract includes computing a payment to be performed between users (e.g., the cloud service client and cloud provider) and performing the payment between the users. For example, the smart contract can compute a payment to be made by the cloud service client to the cloud provider for use of cloud resources. In another example, the smart contract can compute a payment to be made by the cloud provider to the cloud service client for unused cloud resources and/or for a breach by the cloud provider of a service level agreement between the cloud provider and the cloud service client. In some embodiments, the smart contract can initiate a cryptocurrency transfer between the users. In some implementations, the cloud resource management system can identify the users based on the identification of the user(s) as stored in the transaction data. The cryptocurrency transfer can be sent over a secured communication channel from the cloud resource management system to the cloud provider and/or cloud service client. The secured communication channel can be a VPN channel, an SSH channel, a TLS channel, or any similar secured communication channel.

In some implementations, the cloud resource management system can build another transaction reflecting the payment data from the one or more users and broadcast the transaction (i.e., data including the payment data) over the network. In some implementations, the multiple nodes of the distributed ledger can listen for the transaction sent (e.g., broadcasted) over the network. A node of the distributed ledger can then retrieve the data associated with the transaction. Responsive to retrieving the transaction data, the node of the distributed ledger can validate the transaction data. Responsive to validating the transaction data, the node of the distributed ledger can add the transaction data to a current block (e.g., the block that is being assembled based on incoming transaction data). Responsive to determining that the block has reached a predefined size, the node of the distributed ledger can broadcast the block on the network to other nodes of the distributed ledger. The node of the distributed ledger can further add the block to a local copy of the blockchain stored in a local storage of the node of the distributed ledger.

Thus, a distributed ledger can be used to record each aspect of consumption, metering, and billing cloud resources between a cloud provider and a cloud service client in a computer system. By maintaining a record of each transaction on a distributed ledger, implementations of the present disclosure can allow for more flexibility between cloud providers and cloud service clients to come up with resource consumption models that are dynamic and configured according to each user's preferences. Further, there can be significant improvement in accuracy and resiliency when obtaining metering data. Being able to use multiple cloud resource metering sources aids in avoiding the need for blind trust between a cloud provider and a cloud service client since a cloud service client no longer needs to rely on a cloud provider to accurately report metering usage. Additionally, implementations of the present disclosure can aid in providing transparency, data integrity, and a tamper-proof audit trail since each aspect of consumption, metering, and billing for cloud resources is recorded using the distributed ledger.

Various aspects of the above referenced methods and systems are described in details herein below by way of examples, rather than by way of limitation.

FIG. 1 depicts a block diagram of a network architecture 100 in which implementations of the disclosure may operate. Although implementations of the disclosure are described in accordance with a certain type of system, this should not be considered as limiting the scope or usefulness of the features of the disclosure. In some implementations, the network architecture 100 may be used in a Platform-as-a-Service (PaaS) system, such as OpenShift®. The PaaS system provides resources and services for the development and execution of applications owned or managed by multiple users. A PaaS system provides a platform and environment that allow users to build applications and services in a clustered computing environment ("the cloud").

As shown in FIG. 1, the network architecture 100 includes a distributed ledger 120 communicably coupled to user devices, such as a user device 110 and a user device 115, a database 130, a cloud resource management system 140, a set of cloud providers 171, 173, a metering source 117, a cloud pricing blockchain middleware 150, and a cloud resource management system 151 via a network 101. Network 101 may be a private network (e.g., a local area network (LAN), a wide area network (WAN), intranet, or other similar private networks) or a public network (e.g., the Internet). The distributed ledger 120 may include one or more nodes of the distributed ledgers 160, 165 across one or more machines such as server computers, desktop computers, or any other computing device. Each node of the distributed ledger 160, 165 may store data (i.e., transaction data) locally in each node of the distributed ledger's local storage. Each node of the distributed ledger 160, 165 is a node of the distributed ledger. The cloud resource management system 140 can include one or more components, including a graphical user interface 140a that can be accessible to the set of cloud providers 171, 173 and/or the user devices 110, 115, e.g., over the network 101.

The user devices 110 and 115 may be personal computers (PC), laptops, mobile phones, tablet computers, or any other computing devices. The user devices 110 and 115 may run an operating system (OS) that manages hardware and software of the user devices 110 and 115. An application or a daemon (not shown) may run on the user devices 110 and 115 (e.g., on the OS of each user device).

The database 130 may be implemented on one or more machines, such as server computers, desktop computers, or any other computing device. An example of the database 130 is a persistent storage that is capable of storing data that is collected from various data sources including local and remote computing devices such as desktop computers, laptop computers, handheld computers, server computers, gateway computers, mobile communications devices, cell phones, smart phones, or similar computing device. In some embodiments, the database 130 might be a network-attached file server, while in other embodiments the database 130 might be some other type of persistent storage such as an object-oriented database, a relational database, and so forth. The database 130 may be coupled to the cloud resource management system 151 directly or via a network. In an example, the database 130 can be a relational database management system (RDBMS) used for the storage of information regarding the consumption, metering, and billing of cloud resources. In an example, the database 130 can include processing logic to enable the cloud resource management system 151 to search for, retrieve data relating to cloud resources, and generate a smart contract to implement cloud resource pricing and payment.

Each node of the distributed ledgers 160, 165, of examples of the disclosure, can listen for transaction data relating to cloud resources. Such transaction data can be broadcasted over the network 101 by the cloud resource management system 151. The cloud resource management system 151 can receive such data from monitoring the cloud resource management system 140 and/or from the user devices 110 and 115 and/or from the cloud providers 171, 173. The node of the distributed ledgers 160, 165 can retrieve the transaction data broadcasted over the network 101 and validate the transaction data, as described herein below. The node of the distributed ledgers can further add the transaction data to a block of the distributed ledger 120, as described herein above.

The metering source 117 can be one or more metering sources that can send data relating to the metering use of each user device 110, 115 over the network 101 to the cloud resource management system 151.

Figure 2:
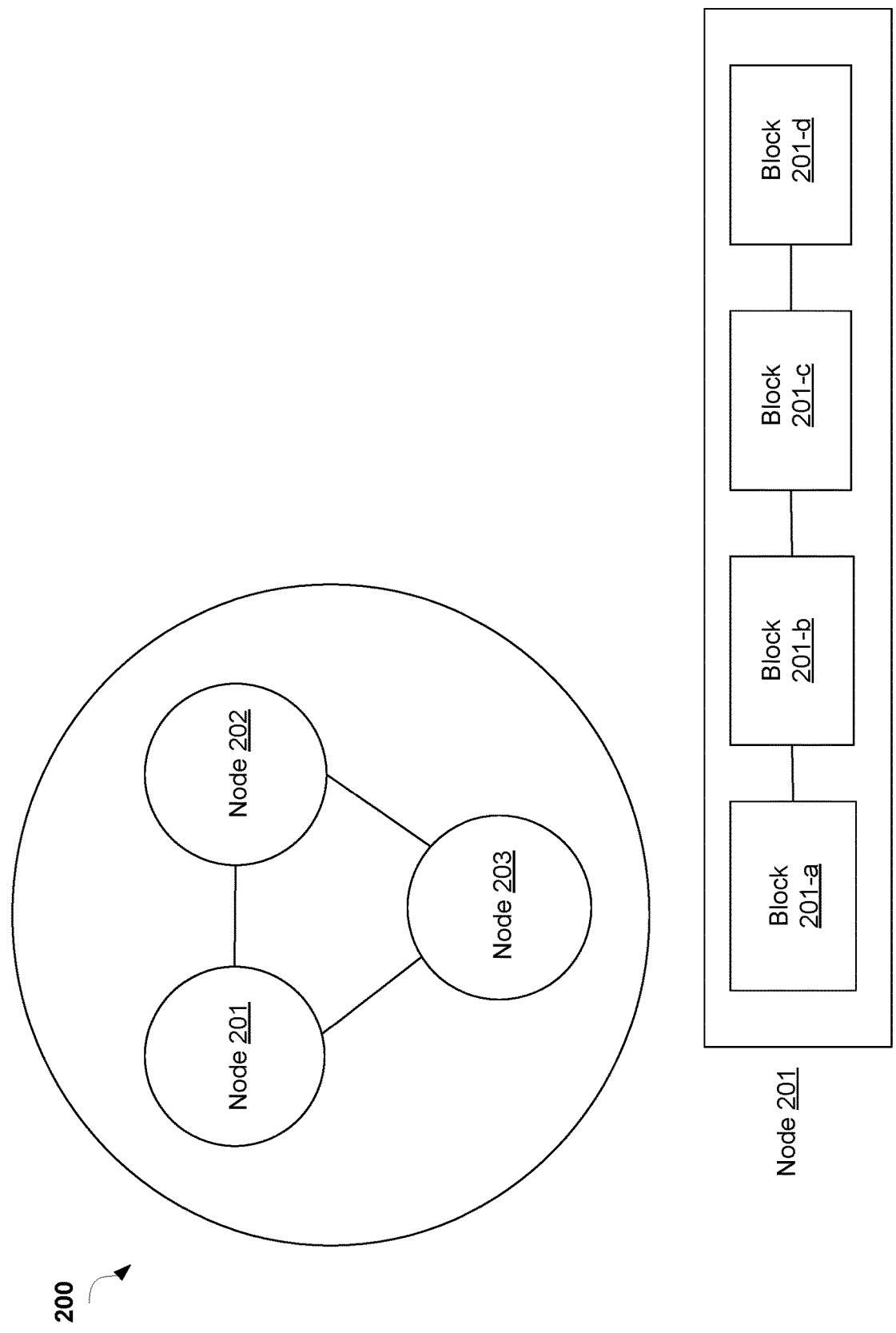
FIG. 2 illustrates an example distributed ledger in accordance with some implementations of the present disclosure.

FIG. 2 is an example of a distributed ledger 200 in accordance with one or more aspects of the present disclosure. In some implementations, the distributed ledger 200 can be a blockchain. A blockchain is a type of distributed ledger that is used, for example, in a Bitcoin crypto-currency system. The blockchain is a data structure comprising a complete history of each block in the distributed ledger 200 from the first block to the most recently added block. Each node, such as node 201 (e.g., node of the distributed ledger 160 of FIG. 1), 202, and 203 as illustrated in FIG. 2, keeps a copy of all or a portion of the blockchain (e.g., the distributed ledger 200) in storage (e.g., on disk or in RAM) that is local to that node. For example, each node 201, 202, and 203 can receive a copy of the distributed ledger 200 upon joining the network.

The distributed ledger 200 can be a public ledger that includes many different individual computer systems that are operated by different entities that maintain a single blockchain. In alternative implementations, the distributed ledger 200 can include one or more individual computer systems that are all operated by a single entity (e.g., a private or closed system).

The nodes 201, 202, and 203 can sequentially record data (e.g., transactions) into the distributed ledger 200 as blocks of data. For example, each of the nodes 201, 202, and 203 operated to "process" blocks (e.g., blocks 201-a, 201-b, 201-c, and 201-d) of the ledger by validating data (e.g., transactions) associated with each block. Generally, only one of the nodes needs to receive the data that has been broadcasted over a network by a cloud resource management system, such as the cloud resource management system 151 of FIG. 1. Once one node receives the data, it may propagate that data to other participating nodes within the distributed ledger 200 so that it can be added to their copy of the distributed ledger.

To validate a new block that is to be consumed (e.g., added) into the distributed ledger 200, the nodes 201, 202, and 203 can perform a hash operation that includes solving a computationally difficult problem that is also easy to verify. For example, each node may attempt to compute a hash value for a block of data using a cryptographic hash function. The input to the hash function may include the data associated with a block, and the output can be a hash value that represents the data (e.g., transactions) of the block. The nodes 202, 202, and 203 can then successively build blocks that include a reference (e.g., a data pointer) to the hash value of the previous block in the distributed ledger 200. As such, the blocks of the distributed ledger 200 are explicitly ordered by reference to the previous block's hash value, which reflects the content of that previous block.

Figure 3:
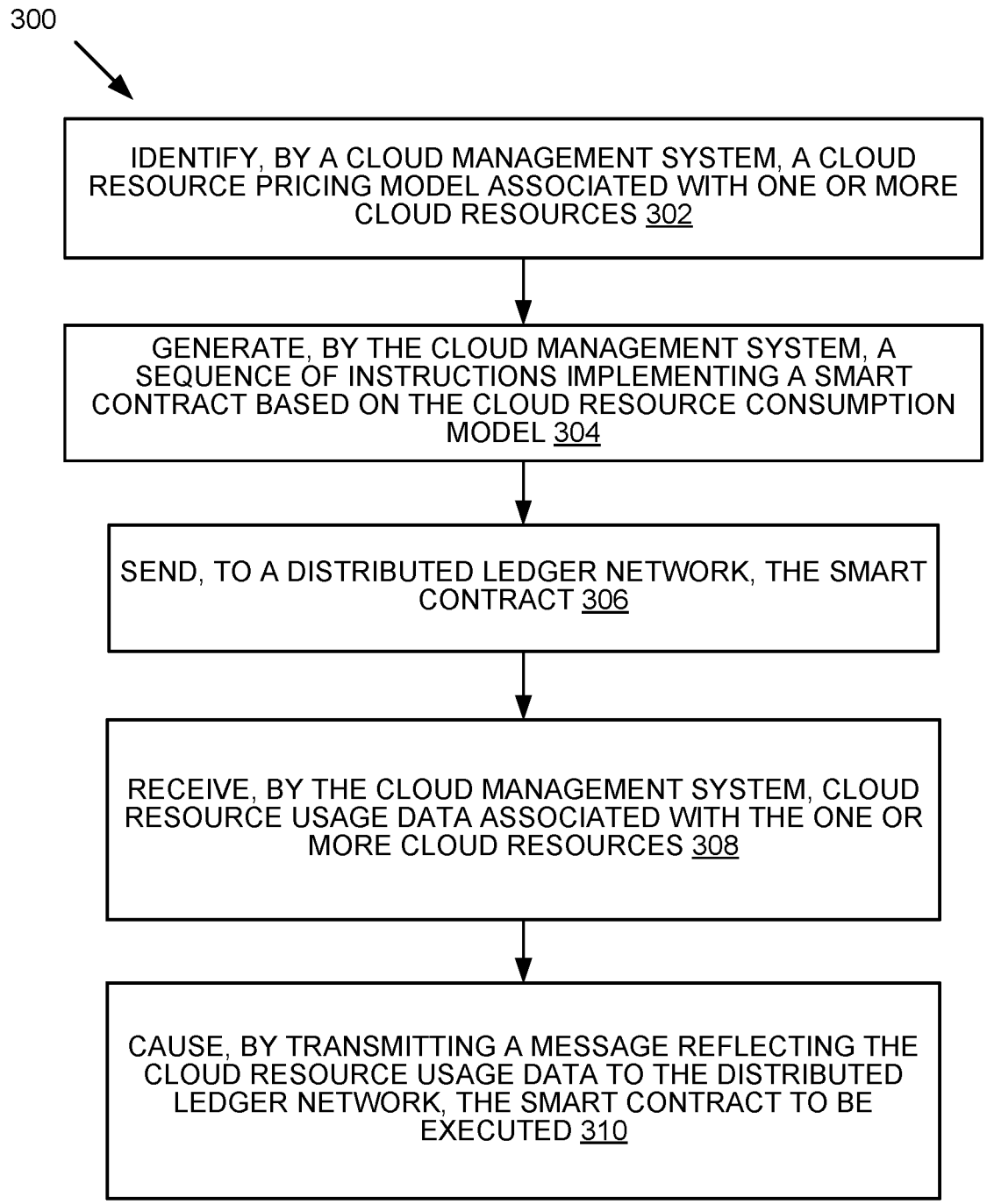
FIG. 3 depicts a flow diagram illustrating an example method of managing the pricing, metering, and billing of cloud resources using distributed ledgers in accordance with some implementations of the present disclosure.

FIG. 3 is a flow diagram illustrating an example method 300 for managing the consumption, metering, and billing of cloud resources using distributed ledgers in accordance with one or more aspects of the present disclosure. Method 300 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, in one embodiment, method 300 begins at block 302, where a cloud resource management system (e.g., the cloud resource management system 151 of FIG. 1) of a cloud resource management system (e.g., the cloud resource management system 140 of FIG. 1) identifies a cloud resource consumption model for one or more cloud resources. In some embodiments, the cloud resource consumption model is received from one or more users (e.g., a cloud resource provider and/or a cloud service client via the user devices 110 and/or 115 of FIG. 1) via a graphical user interface (GUI). The GUI can be hosted on a website that is accessible to each user. The GUI can include a tabular structure with one or more sections. Each section can represent a cloud resource and include one or more drop down boxes. Each drop down box can represent one or more parameters related to pricing for each cloud resource. For example, a drop down box can include different rates per day, minute, and/or week for each cloud resource. Each section can also include a free text field box that can be edited by the one or more users. In some embodiments, the cloud resource management system can implement a validation of the cloud resource consumption model. Implementing the validation of the cloud resource consumption model can include comparing the data format (e.g., schema) of the cloud resource consumption model to the data format (e.g., schema) of a pre-defined pricing application programming interface (API) specification. The pricing API specification can be pre-defined by a user (e.g., a cloud provider) and can be formatted in a JavaScript Object Notation (JSON) structure. In response to identifying that the schema of the selection is compliant (e.g., is in a JSON format) with the format structure of the pre-defined pricing API specification, the cloud resource management system can send the cloud resource consumption model to the one or more users over a network (e.g., the network 101 of FIG. 1) connecting a cloud resource management system (e.g., the cloud resource management system 140 of FIG. 1) and the one or more users such that the one or more users can electronically sign the selection.

At block 304, the cloud resource management system generates a sequence of instructions implementing a smart contract. Generating the sequence of instructions implementing the smart contract can include generating an executable code that receives one or more inputs, which may include the cloud resource consumption model and cloud resource usage data. The smart contract can be used to compute a payment based on the one or more inputs that is to be paid to a party (e.g., a cloud provider and/or cloud service client). For example, the smart contract can include executable code for calculating a total amount to be paid to a cloud provider by multiplying the cloud resource usage data for a cloud resource by a rate specified by the cloud resource consumption model. The total amount to be paid can differ based on a number of factors, such as volume of cloud resources consumed, the time of day when the cloud resources are consumed, etc. For example, the total amount to be paid can be greater if the cloud service client consumes a small volume of cloud resources in contrast to a large volume of cloud resources. Further, the total amount to be paid can be greater if the cloud service client consumes the cloud resources during a time of day when there is significant network traffic and/or network bandwidth issues. In another example, the smart contract can include executable code for calculating a total amount to be paid to a cloud service client, e.g., in a breach of a service-level agreement between a cloud provider and cloud service client.

At block 306, the cloud resource management system sends the smart contract to a node (e.g., a node of a node of the distributed ledger 160 and/or 165 of FIG. 1) of the distributed ledger network (e.g., the distributed ledger network 120 of FIG. 1). Sending the smart contract can include building a transaction reflecting the smart contract and broadcasting the transaction over a network (e.g., the network 101 of FIG. 1) connecting the cloud resource management system and the distributed ledger network. The transaction data can include relevant data relating to the smart contract. In some embodiments, the transaction data can further include metadata, such as a transaction number associated with the transaction.

At block 308, the cloud resource management system receives cloud resource usage data from one or more cloud resource metering sources (e.g., the metering source 117 of FIG. 1), which can include at least a first cloud resource metering source and a second cloud resource metering source. Each cloud resource metering source can be a service that monitors and/or keeps track of the usage of each cloud resource by the one or more users. The cloud resource usage data can include cloud resource usage data for the one or more users. In some embodiments, the cloud resource management system can implement a validation of the cloud resource usage data by identifying that one or more electronic signatures have been received from the one or more cloud resource metering sources. In some embodiments, the cloud resource management system further implements validation of the cloud resource usage data by identifying a weighted average score of each cloud resource metering source. In some embodiments, the cloud resource management system can pre-assign weighted scores and/or reputation scores to each cloud resource metering source. The cloud resource management system can combine the cloud resource usage data received from each of the cloud resource metering sources by comparing the weighted average scores assigned to each cloud resource metering source and prioritizing the cloud resource metering sources with higher weighted average scores.

At block 310, the cloud resource management system causes the smart contract to be executed. In some embodiments, causing the smart contract to be executed includes transmitting (e.g., sending) a message reflecting the cloud resource usage data to a node (e.g., a node of the distributed ledger 160 and/or 165 of FIG. 1) of the distributed ledger network. Transmitting the message cloud resource usage data can include building a transaction reflecting the cloud resource usage data and broadcasting the transaction over the network connecting the cloud resource management system and the distributed ledger network. The transaction data can include relevant data relating to the cloud resource usage data, including data regarding the amount of usage of each cloud resource for a user. In some embodiments, the transaction data can include data identifying the user, such as an IP address of a computer system associated with the user, an ID of the user, and/or an ID of the computer system associated with the user. In some embodiments, the transaction data can further include metadata, such as a transaction number associated with the transaction. In some embodiments, the cloud resource can send the data comprising the cloud resource usage data to the smart contract on the distributed ledger network, where the data comprising the cloud resource usage data can be used as an input to the smart contract to be executed.

Figure 4:
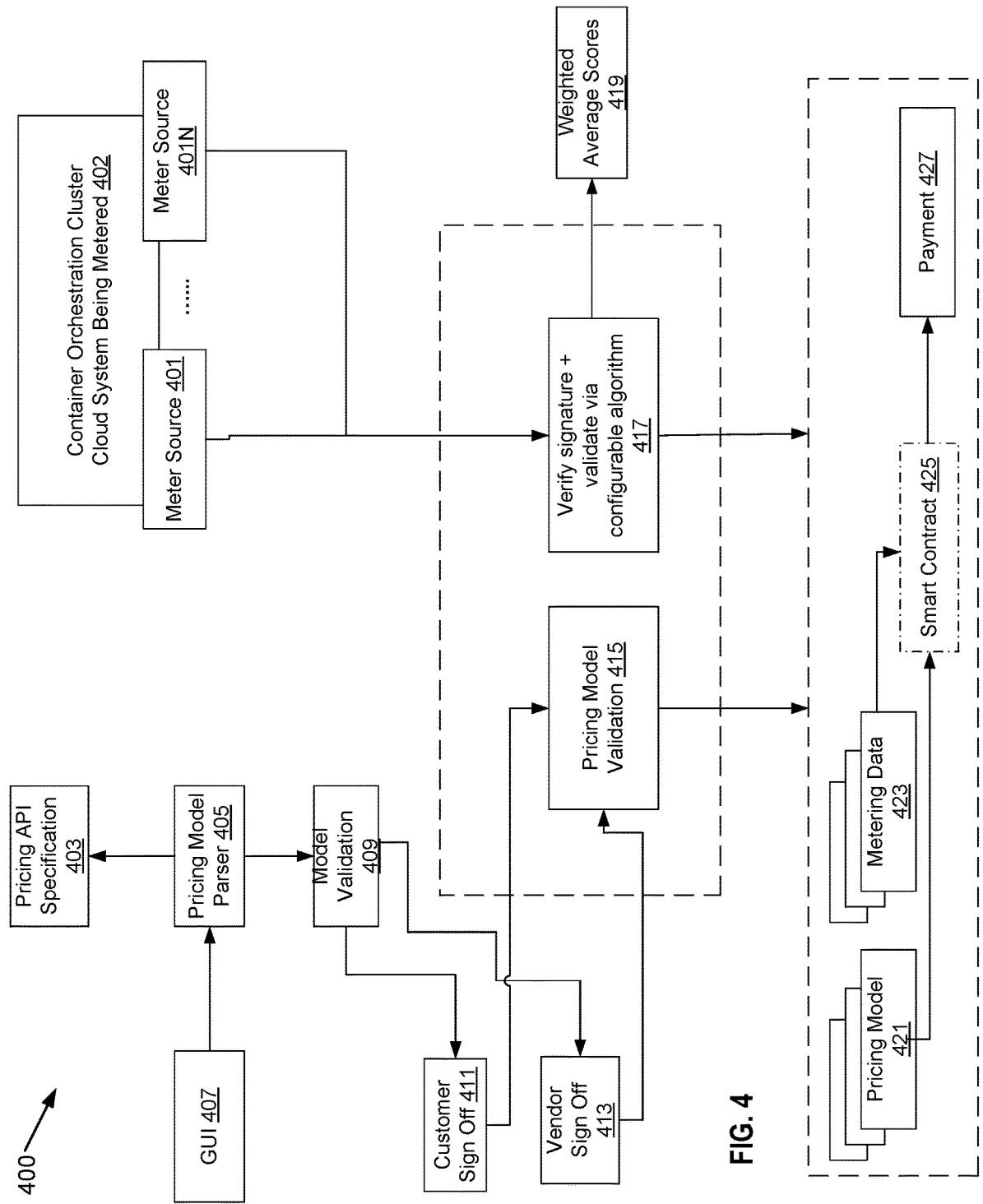
FIG. 4 depicts a block diagram example of a computer system operating in accordance with one or more aspects of the present disclosure.

FIG. 4 is a block diagram example of a computer system 400 operating in accordance with one or more aspects of the present disclosure.

Referring to FIG. 4, in one embodiment, the computer system 400 can include a graphical user interface (GUI) 407. The GUI can be hosted on a website that is accessible to one or more users (e.g., a cloud resource provider and/or a cloud service client via the user devices 110 and/or 115 of FIG. 1). The GUI can include a tabular structure with one or more sections. Each section can represent a cloud resource and include one or more drop down boxes. Each drop down box can represent one or more parameters related to pricing for each cloud resource. For example, a drop down box can include different rates per day, minute, and/or week for each cloud resource. Each section can also include a free text field box that can be edited by the one or more users. A selection of a cloud resource consumption model for one or more cloud resources can be received from the one or more users via the GUI. In some embodiments, a cloud resource management system (e.g., the cloud resource management system 151 of FIG. 1) of a cloud resource management system (e.g., the cloud resource management system 140 of FIG. 1) can implement a validation of the cloud resource consumption model specified by the selection. Implementing the validation of the cloud resource consumption model can include using a consumption model parser 405 to compare the schema of the selection to the schema of a pre-defined pricing application programming interface (API) specification 403. The pricing API specification can be pre-defined by a user (e.g., a cloud provider) and can be formatted in a JavaScript Object Notation (JSON) structure. In response to identifying that the schema of the selection is compliant (e.g., is in a JSON format) with the format structure of the pre-defined pricing API specification at block 409, the cloud resource management system can send the selection to the one or more users over a network (e.g., the network 101 of FIG. 1) connecting a cloud resource management system (e.g., the cloud resource management system 140 of FIG. 1) and the one or more users such that the one or more users can electronically sign the selection (e.g., a cloud service client sign off 411 and a cloud provider sign off 413).

Once the one or more users electronically sign the selection (e.g., a threshold condition is satisfied), the cloud resource management system can validate the cloud resource consumption model at block 415. In response the validating the cloud resource consumption model, the cloud resource management system can generate a smart contract 425. Generating the smart contract 425 can include generating an executable code that requires one or more inputs, such as the cloud resource consumption model and cloud resource usage data. The smart contract can be used to compute a payment 427 based on the one or more inputs that is to be paid to a user (e.g., a cloud provider and/or cloud service client). For example, the smart contract can include executable code for calculating a total amount to be paid to a cloud provider by multiplying the cloud resource usage data for a cloud resource by a rate specified by the cloud resource consumption model. In another example, the smart contract can include executable code for calculating a total amount to be paid to a cloud service client, e.g., in a breach of a service-level agreement between a cloud provider and cloud service client.

The cloud resource management system can send the smart contract to a node (e.g., a node of the distributed ledger 160 and/or 165 of FIG. 1) of the distributed ledger network (e.g., the distributed ledger network 120 of FIG. 1). Sending the smart contract can include building a transaction reflecting the smart contract and broadcasting the transaction over a network (e.g., the network 101 of FIG. 1) connecting the cloud resource management system and the distributed ledger network. The transaction data can include relevant data relating to the smart contract. In some embodiments, the transaction data can further include metadata, such as a transaction number associated with the transaction. In some embodiments, the cloud resource management system can also send the cloud resource consumption model to a node of the distributed ledger network, such that the cloud resource consumption model can be stored as a block 421 on the distributed ledger network.

In some embodiments, the cloud resource management system can receive cloud resource usage data from one or more cloud resource metering sources (e.g., metering source 401 through metering source 401N) from a container 402. Each cloud resource metering source can be a service that monitors and/or keeps track of the usage of each cloud resource by the one or more users. The cloud resource usage data can include cloud resource usage data for the one or more users. In some embodiments, the cloud resource management system can implement a validation at block 417 of the cloud resource usage data by identifying that one or more electronic signatures have been received from the one or more cloud resource metering sources (e.g., a threshold condition is satisfied). In some embodiments, the cloud resource management system further implements validation of the cloud resource usage data by identifying a weighted average score of each cloud resource metering source. In some embodiments, the cloud resource management system can pre-assign weighted scores and/or reputation scores (e.g., the weighted average scores 419) to each cloud resource metering source.

The cloud resource management system can send data comprising the cloud resource usage data to a node (e.g., a node of the distributed ledger 160 and/or 165 of FIG. 1) of the distributed ledger network, such that the data comprising the cloud resource usage data can be stored as a block 423 on the distributed ledger network. Sending the data comprising the cloud resource usage data can include building a transaction reflecting the cloud resource usage data and broadcasting the transaction over the network connecting the cloud resource management system and the distributed ledger network. The transaction data can include relevant data relating to the cloud resource usage data, including data regarding the amount of usage of each cloud resource for a user. In some embodiments, the transaction data can include data identifying the user, such as an IP address of a computer system associated with the user, an ID of the user, and/or an ID of the computer system associated with the user. In some embodiments, the transaction data can further include metadata, such as a transaction number associated with the transaction. In some embodiments, the cloud resource can send the data comprising the cloud resource usage data to the smart contract on the distributed ledger network, where the data comprising the cloud resource usage data can be used as an input to the smart contract to generate the payment 427.

Figure 5:
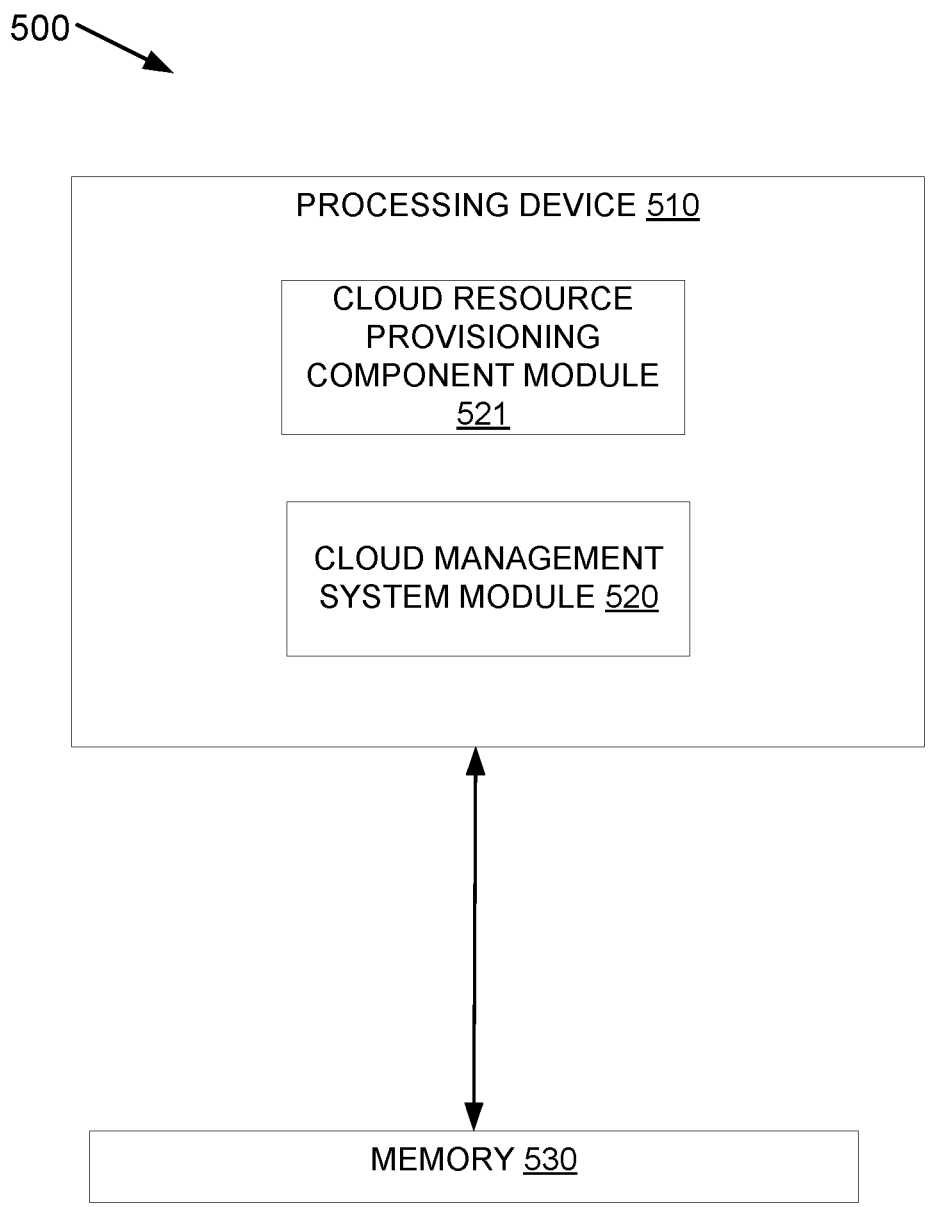
FIG. 5 depicts a block diagram example of a computer system operating in accordance with one or more aspects of the present disclosure.

FIG. 5 is a block diagram example of a computer system 500 operating in accordance with one or more aspects of the present disclosure. Computer system 500 may be the same or similar to the distributed ledger network 120 of FIG. 1 and may include one or more processing devices and one or more memory devices. In the example shown, computer system 500 may include a cloud resource management system module 520 and a cloud resource management system module 521. Alternatively, the functionality of cloud resource management system module 521 may be divided into multiple sub-modules.

Cloud resource management system module 521 is responsible for receiving a selection of a cloud resource consumption model from a user via a cloud pricing blockchain middleware (e.g., the cloud pricing middleware 151 of FIG. 1) via one or more user devices (e.g., the user devices 110, 115 of FIG. 1). The cloud resource management system module 521 is further responsible for building and sending (i.e., broadcasting) transactions over a network (e.g., the network 101 of FIG. 1). The cloud resource management system module 521 is further responsible for listening to the network for broadcasts, such as broadcasts of transactions from a node of the distributed ledger (e.g., the node of the distributed ledgers 160, 165) of a distributed ledger network (e.g., the distributed ledger network 120). The cloud resource management system module 521 is further responsible for receiving cloud resource usage data from one or more cloud resource metering sources. Cloud resource management system module 520 is responsible for generating a smart contract to be stored on a distributed ledger (e.g., the distributed ledger 200 of FIG. 2). Further details with regard to the cloud resource management system module 521 and cloud resource management system module 520 is described herein above with reference to FIGS. 1-4.

Figure 6:
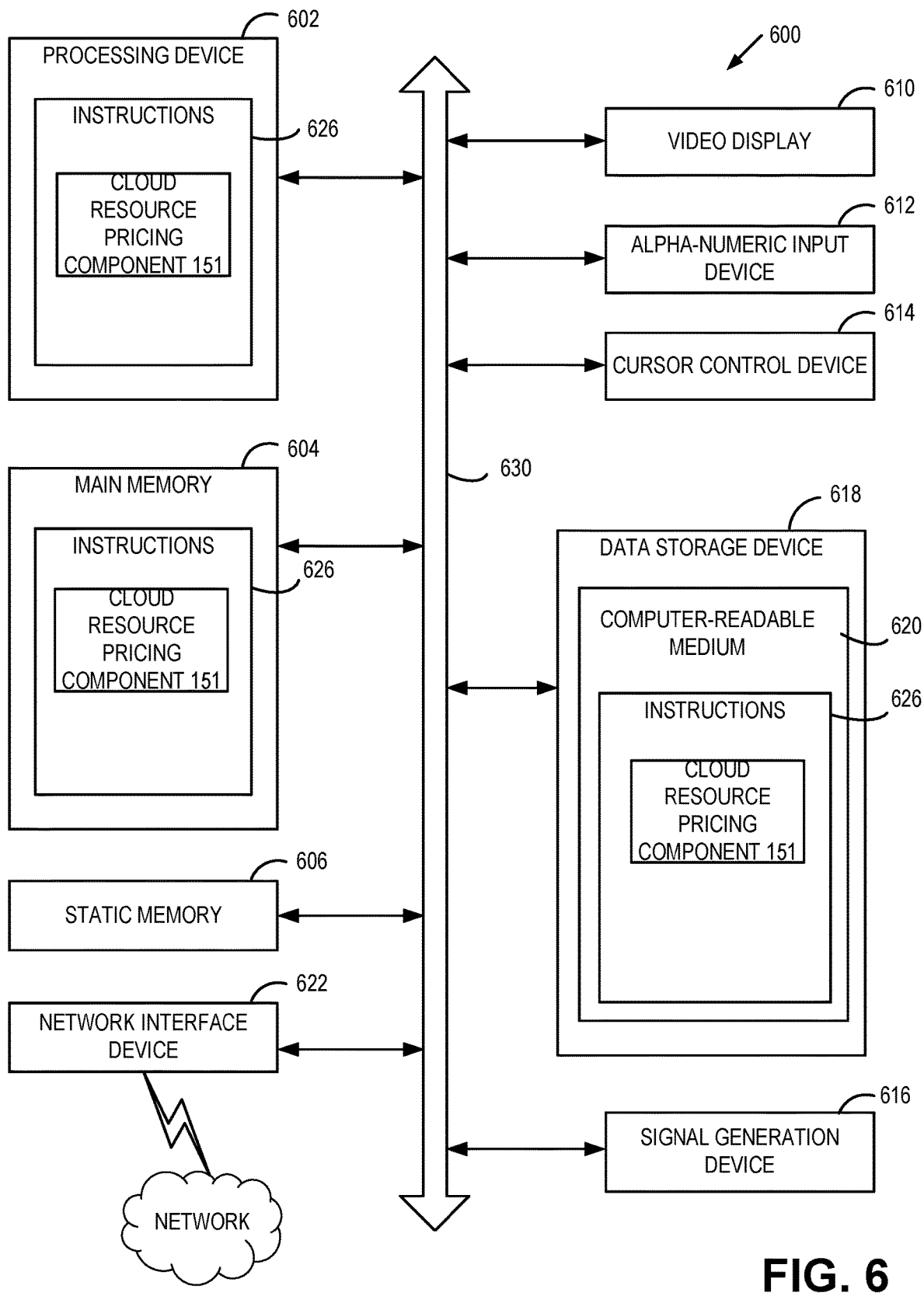
FIG. 6 depicts a block diagram that illustrates one implementation of a computer system in accordance with one or more aspects of the present disclosure.

FIG. 6 is a diagrammatic representation of a machine in the exemplary form of a computer system 600 within which a set of instructions for causing the machine to perform any one or more of the methodologies discussed herein may be executed. In various illustrative examples, computer system 600 may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 600 may include a processing device 602, a main memory 604 (e.g., read-only memory (ROM), flash memory, dynamic random access memory (DRAM) (such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 602 may also be one or more special-purpose processing devices such as an application specific integrated circuit (ASIC), a field programmable gate array (FPGA), a digital signal processor (DSP), network processor, or the like. Processing device 602 may be configured to execute the cloud resource pricing component 151 of FIG. 1 for programming the operations and steps discussed herein.

Computer system 600 may further include a network interface device 608. Computer system 600 may also include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (e.g., instructions executed by the cloud resource pricing component 151) for the computer system 600 embodying any one or more of the methodologies of functions described herein. The instructions 626 for the computer system 600 may also reside, completely or at least partially, within main memory 604 and/or within processing device 602 during execution thereof by computer system 600; main memory 604 and processing device 602 also constituting machine-readable storage media. The instructions 626 may further be transmitted or received over a network 626 via network interface device 608.

Machine-readable storage medium 620 may also be used to store the device queue manner logic persistently. While machine readable storage medium 620 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying, by a cloud resource management system, a cloud resource consumption model associated with one or more cloud resources;
   receiving, from one or more user devices, the cloud resource consumption model, wherein the cloud resource consumption model comprises pricing information of the one or more cloud resources;
   validating the cloud resource consumption model by comparing a data format of the cloud resource consumption model with a data format of a pre-defined pricing application programming interface (API) specification;
   generating, by the cloud resource management system, a sequence of instructions implementing a smart contract based on the pricing information in the cloud resource consumption model;
   sending, to a distributed ledger network, the smart contract;
   receiving, by the cloud resource management system, cloud resource usage data associated with the one or more cloud resources; and
   causing, by transmitting a message reflecting the cloud resource usage data to the distributed ledger network, the smart contract to be executed, wherein execution of the smart contract comprises:
   computing a total amount to be paid based on the pricing information in the cloud resource consumption model; and
   billing the total amount.

2. The method of claim 1, further comprising:
   determining that the data format associated with the cloud resource consumption model is compliant with the data format associated with the pre-defined pricing API specification.

3. The method of claim 1, wherein the cloud resource consumption model is received via a graphical user interface, wherein the graphical user interface comprises a tabular structure comprising one or more sections, wherein each section is associated with a cloud resource, wherein each section comprises at least one or more drop down boxes and a free text field box, and wherein each drop down box is associated with a parameter of the cloud resource.

4. The method of claim 1, further comprising:
   receiving, via a graphical user interface associated with the cloud resource consumption model, one or more electronic signatures associated with the cloud resource consumption model; and
   determining that the one or more electronic signatures satisfies a prerequisite condition.

5. The method of claim 1, wherein the cloud resource usage data is received from a plurality of cloud resource metering sources comprising at least one of: a first cloud resource metering source and a second cloud resource metering source.

6. The method of claim 5, further comprising:
   receiving, from the one or more cloud resource metering sources, one or more electronic signatures associated with the first cloud resource metering source and the second cloud resource metering source; and
   determining that the one or more electronic signatures satisfies a prerequisite condition.

7. The method of claim 5, further comprising:
identifying a respective weighted average score associated with each of the one or more cloud resource metering sources; and
responsive to identifying the respective weighted average score associated with each of the one or more cloud resource metering sources, combining the cloud resource usage data received from the one or more cloud resource metering sources based on the respective weighted average scores.

8. A system comprising:
a memory; and
a processing device, operatively coupled to the memory, to:
identify, by a cloud resource management system, a cloud resource consumption model associated with one or more cloud resources;
receive, from one or more user devices, the cloud resource consumption model, wherein the cloud resource consumption model comprises pricing information of the one or more cloud resources;
validate the cloud resource consumption model by comparing a data format of the cloud resource consumption model with a data format of a pre-defined pricing application programming interface (API) specification;
generate, by the cloud resource management system, a sequence of instructions implementing a smart contract based on the pricing information in the cloud resource consumption model;
send, to a distributed ledger network, the smart contract;
receive, by the cloud resource management system, cloud resource usage data associated with the one or more cloud resources; and
cause, by transmitting a message reflecting the cloud resource usage data to the distributed ledger network, the smart contract to be executed, wherein execution of the smart contract comprises:
computing a total amount to be paid based on the pricing information in the cloud resource consumption model; and
billing the total amount.

9. The system of claim 8, wherein the processing device is further to:
determine that the data format associated with the cloud resource consumption model is compliant with the data format associated with the pre-defined API specification.

10. The system of claim 8, wherein the cloud resource consumption model is received via a graphical user interface, wherein the graphical user interface comprises a tabular structure comprising one or more sections, wherein each section is associated with a cloud resource, wherein each section comprises at least one or more drop down boxes and a free text field box, and wherein each drop down box is associated with a parameter of the cloud resource.

11. The system of claim 8, wherein the processing device is further to:
receive, via a graphical user interface associated with the cloud resource consumption model, one or more electronic signatures associated with the cloud resource consumption model; and
determine the one or more electronic signatures satisfies a prerequisite condition.

12. The system of claim 8, wherein the cloud resource usage data is received from one or more cloud resource metering sources comprising at least one of: a first cloud resource metering source and a second cloud resource metering source.

13. The system of claim 12, wherein the processing device is further to:
receive, from the one or more cloud resource metering sources, one or more electronic signatures associated with the first cloud resource metering source and the second cloud resource metering source; and
determine that the one or more electronic signatures satisfies a prerequisite condition.

14. The system of claim 12, wherein the processing device is further to:
identify a respective weighted average score associated with each of the one or more cloud resource metering sources; and
responsive to identifying the respective weighted average score associated with each of the one or more cloud resource metering sources, combine the cloud resource usage data received from the one or more cloud resource metering sources based on the respective weighted average scores.

15. A non-transitory computer-readable storage medium comprising instructions that, when executed by a processing device, cause the processing device to:
identify, by a cloud resource management system, a cloud resource consumption model associated with one or more cloud resources;
receive, from one or more user devices, the cloud resource consumption model, wherein the cloud resource consumption model comprises pricing information of the one or more cloud resources;
validate the cloud resource consumption model by comparing a data format of the cloud resource consumption model with a data format of a pre-defined pricing application programming interface (API) specification;
generate, by the cloud resource management system, a sequence of instructions implementing a smart contract based on the pricing information in the cloud resource consumption model;
send, to a distributed ledger network, the smart contract;
receive, by the cloud resource management system, cloud resource usage data associated with the one or more cloud resources; and
cause, by transmitting a message reflecting the cloud resource usage data to the distributed ledger network, the smart contract to be executed, wherein execution of the smart contract comprises:
computing a total amount to be paid based on the pricing information in the cloud resource consumption model; and
billing the total amount.

16. The non-transitory computer-readable storage medium of claim 15, wherein the processing device is further to
determine that the data format associated with the cloud resource consumption model is compliant with the data format associated with the pre-defined pricing API specification.

17. The non-transitory computer-readable storage medium of claim 15, wherein the cloud resource consumption model is received via a graphical user interface, wherein the graphical user interface comprises a tabular structure comprising one or more sections, wherein each section is associated with a cloud resource, wherein each section comprises at least one or more drop down boxes and a free text field box, and wherein each drop down box is associated with a parameter of the cloud resource.

18. The non-transitory computer-readable storage medium of claim 15, wherein the processing device is further to:
   receive, via a graphical user interface associated with the cloud resource consumption model, one or more electronic signatures associated with the cloud resource consumption model; and
   determine the one or more electronic signatures satisfies a prerequisite condition.

19. The non-transitory computer-readable storage medium of claim 15, wherein the cloud resource usage data is received from one or more cloud resource metering sources comprising at least one of: a first cloud resource metering source and a second cloud resource metering source.

20. The non-transitory computer-readable storage medium of claim 19, wherein the processing device is further to:
   receive, from the one or more cloud resource metering sources, one or more electronic signatures associated with the first cloud resource metering source and the second cloud resource metering source; and
   determine that the one or more electronic signatures satisfies a prerequisite condition.

* * * * *